Patented Oct. 3, 1950

2,524,108

UNITED STATES PATENT OFFICE 2,524,108

INSECTICIDAL COMPOSITION COMPRISING PYRETHRINS AND A SYNERGIST THEREFOR

Oscar F. Hedenburg, Pittsburgh, Pa., assignor to Harold W. Moburg, Toledo, Ohio, trustee No Drawing. Application October 30, 1948, Serial No. 57,616

5 Claims. (Cl. 167—24)

This invention relates to insecticidal compositions containing pyrethrins and a synergist therefor.

Out of all the insecticide materials in use, the one which approaches most nearly the ideal is pyrethrum flowers—or, rather, the active insecticidal principle, pyrethrins, which appear in the pyrethrum flowers. Pyrethrins are immediately toxic to a very great number of insect pests at different concentrations varying with the resistance of the insects mentioned. Also they are substantially non-toxic to animals and plants.

The endeavor to extend the usefulness of pyrethrins by increasing their effectiveness and lowering their cost has led to extensive research on another class of insecticide materials customarily referred to as synergists. As the word synergist is generally understood, such may or may not have appreciable insecticidal value when used by themselves, but when used in combination with suitable quantities of some other insecticidal substance such as pyrethrins, the resultant insecticide has an effectiveness appreciably greater than would be calculated from the sum total of its constituents. It may be said that synergism or synergistic action has occurred when the above condition is met.

The mechanism of synergism is by no means understood on the basis of present knowledge. It is not only possible but probable, that it differs in the case of different synergistic combinations.

The application of synergists in the problems connected with pyrethrum insecticides has received particular attention both because of the recognizably unique value of pyrethrins and because their relatively high cost has encouraged study of methods to extend their usefulness and reduce the cost of insecticides made from them. Many substances have been found possessing more or less synergistic value when used with pyrethrins, but these known synergists are, so far as I am aware, deficient in two important respects. First, while their use does extend the killing power of the pyrethrins and permits effective insecticides to be made having lower pyrethrin content than would otherwise be the case, it is still necessary that the pyrethrin content be substantially high. Secondly, these synergists have displayed marked specificity in that while they may increase the killing power of pyrethrins against some varieties of insects to a marked extent, they have been found to be relatively ineffective in the case of other and more numerous varieties of insects.

The foregoing being in brief the state of the art, it is therefore an object of the present invention to provide a novel insecticidal composition containing pyrethrins and a synergist therefor, the composition being substantially non-toxic and non-injurious to both animals and plants, at least to an extent which permits their practically unrestricted use.

It is also an object of the present invention to provide such compositions which may contain a relatively small percentage of pyrethrins without loss of efficiency, and in some instances with a considerable gain in efficiency.

It is a further object of this invention to provide such compositions which are markedly superior in their freedom from specificity.

The foregoing and other objects are accomplished in accordance with the present invention by preparing a composition containing pyrethrins and as a synergist therefor a compound of the generic formula

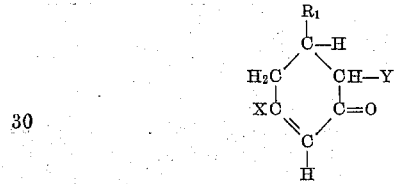

in which $R_1$ is the 3,4-methylenedioxyphenyl radical, X is an octenyl radical or an alkyl radical containing from two to eleven carbon atoms, and Y is a hydrogen atom or a —COOR group in which R is an alkyl radical having from one to six carbon atoms, the cyclohexyl radical or the n-butoxyethyl radical.

Thus, in the preceding generic formula, R may be, for example, the methyl, ethyl, n-butyl, secondary butyl, n-hexyl, etc. radical, and X may be the ethyl, propyl, n-butyl, isobutyl, n-amyl, n-hexyl, n-octyl, nonyl, undecyl, etc. radical. The compounds of the aforementioned generic formula may be prepared as is described in my copending application, Serial No. 684,545, filed July 19, 1946, of which application the present application is a continuation-in-part.

Tests were carried out on the compositions of the present invention by the Peet-Grady procedure in comparison with a standard insecticide known as the Official Test Insecticide, hereinafter referred to as the O. T. I., and containing 100 milligrams of pyrethrins per 100 cc. Under standard conditions and using flies of normal resistance, the O. T. I. will give a kill of approximately 50% of the flies in the test.

Utilizing compositions containing pyrethrins and a mixture of two compounds of the foregoing generic formula in which X was the n-hexyl radical and Y was a hydrogen atom or the —COOC$_2$H$_5$ radical (the mixture constituting that identified as No. 312 in my aforementioned copending application), the following results were obtained. In setting forth these results, it has seemed desirable to quote them in terms of the adjusted kill method, which is generally understood and widely used, and by which the O. T. I. kill is taken at 50 and the various results adjusted to that. In actual practice, in running the tests, the sample under test is compared with the O. T. I. by running a number of different tests with the sample and interspersing with these occasional tests with the O. T. I. Since, however, the kill with the O. T. I. will vary on different lots of flies and from day to day, a better comparison of work extending over a long period is obtained if the results are adjusted, which is done in the following way:

If, for example in a given series of tests the O. T. I. is found to give a kill of 45 and the test sample gives a kill of 75, the adjusted kill is reported by adding 5 to the O. T. I. to bring it up to 50 and an equal amount to the test sample, so that these results would be reported at 50 and 80, rather than as 45 and 75. In a similar way, if the flies are relatively weak so that the O. T. I. gives a kill of 60 and the test sample a kill of 90, the same adjustment is made bringing the relative results to 50 and 80. What slight errors may result in this adjusted kill method are supposed to be more than compensated by relative uniformity of the comparisons. The following results have been obtained.

| Sample | | Per Cent Kill |
|---|---|---|
| A | O. T. I. (100 mg. pyrethrins per 100 cc.) | 50 |
| B | 40 mg. pyrethrins per 100 cc. | 22 |
| C | 175 mg. pyrethrins per 100 cc. | 78 |
| D | One gram Compound No. 312 per cc. | 80 |
| E | One gram Compound No. 312 plus 5 mg. pyrethrins per 100 cc. | 88 |
| F | 500 mg. Compound No. 312 plus 10 mg. pyrethrins per 100 cc. | 86 |
| G | 400 mg. Compound No. 312 plus 15 mg. pyrethrins per 100 cc. | 88 |
| H | 300 mg. Compound No. 312 plus 30 mg. pyrethrins per 100 cc. | 90 |
| I | 300 mg. Compound No. 312 plus 20 mg. pyrethrins per 100 cc. | 85 |
| J | 200 mg. Compound No. 312 plus 20 mg. pyrethrins per 100 cc. | 75 |
| K | 150 mg. Compound No. 312 plus 15 mg. pyrethrins per 100 cc. | 65 |

The foregoing results clearly demonstrate several points:

First, that in insecticides of this type, the incorporation of Compound No. 312, as a synergist permits the reduction of the pyrethrin content almost to the vanishing point with no sacrifice of efficiency as is evidenced by the fact that several of the above combintions containing varying proportions of Compound No. 312 and a pyrethrin content of as low as 5 mg. gave results not only comparable with those obtained with the O. T. I., but also with the much stronger pyrethrum insecticide containing 175 mg. of pyrethrins per 100 cc. Second, the results also demonstrate that the proportions in which Compound No. 312 and pyrethrins may be combined, vary within very wide limits and will be controlled by economic considerations and personal opinions rather than by limitations inherent in the chemical itself.

In a completely different type of insecticidal preparation for the control of body lice, a series of experiments was made with impregnated powders containing varying proportions of Compound No. 312, both without and with pyrethrins, with the following results:

| Concentration | Per Cent Survives 24 hours |
|---|---|
| 5% Compound No. 312 | 28 |
| 2% Compound No. 312 | 20 |
| 1% Compound No. 312 | 48 |
| 0.5% Compound No. 312 | 64 |
| 0.5% Compound No. 312 plus 0.01% pyrethrins | 0 |
| 0.25% Compound No. 312 plus 0.005% pyrethrins | 27 |
| 0.025% Compound No. 312 plus 0.005% pyrethrins | 56 |

This series of tests is particularly illuminating in its comparison with the results obtained where 0.5% Compound No. 312 used alone gave 64% survival, whereas 0.5% used with the addition of as little as 0.01% pyrethrins gave no survivors at all.

Another method of using insecticide materials is in solution in liquified "Freon" gas (fluo-chlormethane) in a pressure container. When the pressure is released, this releases extremely fine atomized particles which are highly toxic to insects. A comparison was made under control conditions on three formulas, with the following results:

| | | Per cent knockdown | | Per cent Mortality 24 hours |
|---|---|---|---|---|
| | | 10 min. | 2 hrs. | |
| A | 0.4% pyrethrins and 8% cottonseed oil | 35 | 1 | 2 |
| B | 0.4% pyrethrins plus 8% cottonseed oil plus 2% of Compound No. 312 | 98 | 99 | 68 |
| C | 8% cotton seed oil plus 5% Compound No. 312 | 0 | 0 | 0 |

The comparison of these three tests furnishes additional proof of the synergistic value of the chemical, Compound No. 312, in that the addition of 2% of Compound No. 312 in formula "B" above greatly increased the knockdown and kill as compared with formula "A," whereas in formula "C" the absence of any pyrethrin content whatever caused the results to be zero in this particular test.

In another very important field, namely the control of common agricultural insects, principally those infesting food crops, there was prepared what is known as an impregnated dust base formulated in such a way as to contain impregnated on an inert carrier 2.5% of Compound No. 312, and 0.2% pyrethrins. This dust base was then converted into a finished insecticide by mixing it in various proportions with a completely inert carrier, namely pyrophyllite or talc, in such proportions that the finished insecticides contain from 15 pounds to the hundred of the dust base to 30 pounds per hundred; and for most instances 20 pounds. The finished dust made on the 20-pound basis contained therefore, 0.5% of Compound No. 312 and 0.04% pyrethrins. Under practical conditions this dust was found to be particularly effective against a wide variety of insects including the following:

Bean leafhoppers ⎫
Potato leafhoppers ⎬ *Empoasca fabae*
Grape leafhoppers, *Erythroneura comes*
Blunt-nosed cranberry leafhoppers
Mexican bean beetles, *Epilachna varivestis*
Cucumber beetles, *Diabrotica duodecimpunctata* and *D. vittata*
Imported green cabbage worm, *Ascia rapae*
Cabbage loopers, *Autographa brassicae*
Diamond-Back moth larvae, *Plutella maculipennis*
Harlequin bug, *Murgantia histrionica*

Also, numerous others, although in the case of some of the more resistant and more adult forms of some of these insects it was found desirable to use a higher concentration. The effectiveness of these dusts against the insects in question and at the concentrations used was adequate proof that the dust base referred to above as containing 2.5% of Compound No. 312 and only 0.2% pyrethrins possessed an effectiveness at least equal to similar impregnated dusts made up with pyrethrins as their sole insecticidal constituent and containing 1% pyrethrins.

In many cases, practical control of agricultural insects is more readily obtained with sprays and in the formulation of these sprays what is known as Pyrethrum Extract No. 20 is frequently used commercially. Pyrethrum Extract No. 20 means a product containing 2 grams pyrethrins per 100 cc. dissolved in a mineral oil base unless otherwise specified, although occasionally made with alcohol instead of mineral oil. In sprays of this type, there have been substituted very effectively a combination containing 600 mg. of pyrethrins and 6 grams of Compound No. 312 per 100 cc., for a Pyrethrum Extract No. 20 in the same proportions and with beneficial results as regards the effectiveness of the finished spray, thereby furnishing another proof of the synergistic value of Compound No. 312 in combination with pyrethrum and its ability to substitute a large proportion of the pyrethrins which would otherwise be required with no loss in effectiveness.

It should be understood in connection with these references to field tests made against agricultural insects that percentage comparisons such as were quoted above in connection with the Peet-Grady tests etc., are difficult and frequently untrustworthy and are less valuable at best than careful observations by competent observers to the effect that a practical commercial degree of control has been obtained.

Further compositions containing pyrethrins and a mixture of two compounds of the foregoing generic formula in which X was the isobutyl radical and Y was a hydrogen atom or the

—COOC$_2$H$_5$ radical (No. 332 of my aforementioned application), and further compositions containing pyrethrins and a mixture of two compounds of the foregoing generic formula in which X was the n-amyl radical and Y was a hydrogen atom or the —COOC$_2$H$_5$ radical (No. 333 of my aforementioned application) were similarly tested by the Peet-Grady Chamber test and their effectiveness is indicated by the results shown in the following table:

| Composition | Knockdown in 10 minutes | Kill after 24 hours |
|---|---|---|
| | Per cent | Per cent |
| 0.2% No. 332 40 mg. Pyrethrins 1 and 2 per 100 cc | 92.7 | 88.2 |
| 0.5% No. 332 20 mg. Pyrethrins 1 and 2 per 100 cc | 95.7 | 91.0 |
| 0.5% No. 332 alone per 100 cc | | 3 |
| 20 mg. Pyrethrins 1 and 2 alone per 100 cc | | 17 |
| 0.2% No. 333 40 mg. Pyrethrins 1 and 2 per 100 cc | 90.4 | 88.0 |
| 0.5% No. 333 20 mg. Pyrethrins 1 and 2 per 100 cc | 89.8 | 87.5 |
| 0.5% No. 333 alone per 100 cc | | .5 |
| 20 mg. Pyrethrins 1 and 2 alone per 100 cc | | 17 |
| O. T. I | 90.2 | 62.9 |

Further compositions containing pyrethrins and a mixture of two compounds of the foregoing generic formula in which X was the octenyl radical and Y was a hydrogen atom or a —COOC$_2$H$_5$ radical (No. 396 of my aforementioned copending application) were similarly tested and gave the following results:

| | Knockdown in 10 minutes | Kill after 24 hours |
|---|---|---|
| | Per cent | Per cent |
| 0.3% Compound No. 396 plus 30 mg. Pyrethrins 1 and 2 per 100 cc | 89.4 | 85.7 |
| 0.5% Compound No. 396 alone per 100 cc | | 1.3 |
| 30 mg. Pyrethrins 1 and 2 alone per 100 cc | | 20.5 |
| O. T. I | 92.8 | 38.9 |

The products of the invention, when used in the intended manner, are innocuous to human beings. They are tasteless and substantially odorless. And they neither sting nor irritate the eyes or nose or mucous membranes of the users.

The new products may be prepared for use as insecticides according to various methods of procedure, and the following description is illustrative of the manner of use for insecticidal purposes, the illustrations being for Compound No. 312 described above, but being applicable to other compounds when similarly used.

For a spray, a concentrate may be first prepared by mixing 30 grams of Compound No. 312 and 3 grams of pyrethrins with sufficient suitable solvent to make 100 cc. of a concentrated compound that will be miscible with a diluent such as kerosene or other petroleum distillate as a vehicle.

For use as a spray, the foregoing concentrate is diluted 100 times with the vehicle, or 1/100 of the foregoing quantities i. e., 0.3 gm. of Compound No. 312, and 30 mgs. of pyrethrins 1 and 2 are incorporated in the petroleum fraction vehicle, i. e., in 100 cc. of kerosene or other petroleum distillate as a vehicle.

As an agricultural dust, a dry concentrate composed of 250 mgs. of pyrethrins and 2.5 gms. of Compound 312 are added to 100 gms. of a finely comminuted dust-like carrier which dust may be talc, pyrophyllite, or walnut shell dust, or the like. This concentrate may be repacked for use with three or four times the above-indicated quantity of dust.

A further concentrated dust composition may be composed of 2.5% of Compound No. 312 and 0.25% of pyrethrins, the balance being a dust-like carrier of the above-indicated types. For use, one part of the foregoing concentrate is diluted with approximately four parts by weight of dust.

As a concentrated composition for an aerosol bomb, there may be employed approximately 20% of Compound No. 312, approximately 4% of pyrethrins contained in a suitable solvent such as for example, cyclohexenone, 4% of a non-volatile oil such as salad oil for modifying particle sizes when sprayed in a room. The foregoing concentrate is diluted for use with "Freon" (fluor-chlor-methane) in the approximate ratio of one part of the concentrated composition to seven parts by weight of fluor-chlor-methane.

There has also been amployed successfully a composition composed of 30 gms. of Compound No. 312, and 3.2 gms. of pyrethrins, with a non-volatile oil content as indicated above. This compound also may be diluted with fluor-chlor-methane in the ratio of one part of the compound to seven parts of fluor-chlor-methane (parts by weight).

From the foregoing description it will be seen that the new products are useful and valuable insecticides, demonstrating a type of synergism not heretofore observed so far as I am aware, since the new products may contain an unusually small percentage of pyrethrins.

The foregoing examples also demonstrate the absence of specificity in the compositions. While only a limited number of insects have been mentioned specifically, this number and the wide variety of insects represented indicate that these combinations, instead of being specific, are effective generally against insects known to be susceptible to pyrethrum in any form and at any practical concentration. Moreover, these examples demonstrate that the relative proportions of these synergistic chemicals and pyrethrins are subject to no limitations other than those imposed by the practical consideration of obtaining best results at the lowest cost. The synergism itself occurs regardless of whether the combination consists essentially of pyrethrins with a minor proportion of the synergistic chemicals, or essentially of the synergistic chemicals with a minor and almost negligible proportion of pyrethrins, and at all points between these two extremes.

I claim:

1. An insecticide composition containing pyrethrins and a compound of the generic formula 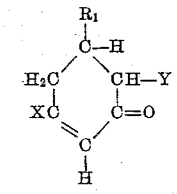 in which $R_1$ is the 3,4-methylenedioxyphenyl radical, X is a substituent selected from the group consisting of alkyl radicals having from two to eleven carbon atoms and octenyl radicals, and Y is a substituent selected from the group consisting of hydrogen and $$-\overset{\displaystyle O}{\overset{\|}{C}}-O-R$$

in which R is a substituent selected from the group consisting of alkyl radicals having from one to six carbon atoms, the cyclohexyl radical and the n-butoxyethyl radical.

2. The composition of claim 1 in which X is the isobutyl radical.

3. The composition of claim 1 in which X is the n-amyl radical.

4. The composition of claim 1 in which X is the n-hexyl radical.

5. An insecticide composition containing pyrethrins and 1-3,4-methylenedioxyphenyl-2-ethylcarboxy-5-n-hexyl-cyclohexenone-3-Δ-4,5.

OSCAR F. HEDENBURG.

REFERENCES CITED

The following references are of record in the file of this patent:

UNITED STATES PATENTS

| Number | Name | Date |
|---|---|---|
| 2,421,569 | La Forge | June 3, 1947 |
| 2,421,570 | La Forge | June 3, 1947 |
| 2,431,845 | Synerholm | Dec. 2, 1947 |

OTHER REFERENCES

Synerholm et al.; Contributions from Boyce Thompson Institute, vol. 14, pages 78–79 (1945).

Harvill et al.; Contributions from Boyce Thompson Institute, vol. 13, pages 87–92, April-June 1943.